(12) United States Patent
Kim

(10) Patent No.: US 7,755,789 B2
(45) Date of Patent: Jul. 13, 2010

(54) PRINTING SYSTEM AND PRINTING METHOD TO CONSERVE DEVELOPER

(75) Inventor: Joo-duck Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1315 days.

(21) Appl. No.: 11/244,074

(22) Filed: Oct. 6, 2005

(65) Prior Publication Data

US 2006/0082799 A1    Apr. 20, 2006

(30) Foreign Application Priority Data

Oct. 20, 2004    (KR)    ............... 10-2004-0083863

(51) Int. Cl.
*G06F 3/12*    (2006.01)
*G06K 15/00*    (2006.01)

(52) U.S. Cl. .............. 358/1.15; 358/1.2; 358/1.18; 358/1.13

(58) Field of Classification Search ........... 358/1.15, 358/1.1, 1.2, 1.6, 1.5, 1.9, 1.13, 1.14, 1.18, 358/1.11, 527, 407, 434, 435, 436, 437, 438, 358/439, 468; 347/2, 3, 5, 14, 23; 399/1, 399/8, 9, 14, 18, 24, 25, 27, 28, 29, 30, 35, 399/53, 61, 60, 62, 63, 64, 65, 99, 106, 112, 399/255, 258, 259, 409, 129, 49, 120, 134, 399/224, 239, 253, 254, 265, 359
See application file for complete search history.

(56) References Cited

U.S. PATENT DOCUMENTS 5,580,177 A  *  12/1996  Gase et al. ................. 400/61
2003/0197887 A1 * 10/2003  Shenoy et al. ............. 358/1.15

FOREIGN PATENT DOCUMENTS

| JP | 10-58753 | 3/1998 |
|---|---|---|
| JP | 11-212397 | 8/1999 |
| JP | 2003-295568 | 10/2003 |
| KR | 2001-28933 | 4/2001 |
| KR | 2001-38869 | 5/2001 |
| KR | 2004-57369 | 7/2004 |

OTHER PUBLICATIONS

Chinese Office Action dated Dec. 21, 2007 issued in CN 200510109100.9.

* cited by examiner

*Primary Examiner*—Dov Popovici
(74) *Attorney, Agent, or Firm*—Stanzione & Kim, LLP

(57) ABSTRACT

A printing system and a printing method providing a menu to change printing options to conserve developer. The printing method includes determining whether a developer is deficient by checking the status of the developer when a print command is input; setting new printing options upon determining the deficiency of the developer; and generating and printing an image according to the newly set printing options. Accordingly, it is possible to print more pages using the same amount of developer. Based on the menu to change the printing options, the user can select to change the resolution, the scale of the print, and the N-up, to conserve the developer.

29 Claims, 5 Drawing Sheets

PRINTING SYSTEM AND PRINTING METHOD TO CONSERVE DEVELOPER

CROSS-REFERENCE TO RELATED APPLICATIONS

This application claims the benefit under 35 U.S.C. § 119 (a) from Korean Patent Application No. 2004-83863, filed on Oct. 20, 2004, in the Korean Intellectual Property Office, the disclosure of which is hereby incorporated herein by reference in its entirety.

BACKGROUND OF THE INVENTION

1. Field of the Invention

The present general inventive concept relates to a printing system and a printing method providing a menu to change the printing options to conserve a developer.

2. Description of the Related Art

Developers, such as ink or toner, are consumable goods used by printers, and are relatively high-priced. Thus, printer users try to limit the consumption of the developers, to print more pages with the fixed amount of the developers. In response to the need to optimize the developer usage, a developer save function is provided to save the developer by lowering a printing density or by printing only outlines of texts.

FIG. 1 is a flowchart illustrating how a document is printed according to a conventional developer save function.

A printer controller (not shown) determines deficiency of a residual developer if the residual developer is below a predetermined reference amount (operation S10), and determines whether a developer save mode is set (operation S20). If the developer save mode is set, the printer controller lowers the amount of the developer attached onto a drum by lowering a developing voltage applied at a print section (not shown) so as to limit the amount of the developer consumed to print each page (operation S30). If the developer save mode is not set, the printing task is carried out according to a normal printing mode (operation S40).

According to the conventional approach, the developer save function is executed only when the developer save function is pre-set. If the user inputs a print command while the developer save mode is not pre-set, the printing task is conducted according to printing options previously set, without regard to the deficiency of the residual developer. Therefore, it is hard to answer properly and promptly to the deficiency of the developer.

In addition, when the residual developer is deficient, rather than lowering the printing density, it is more efficient to lower the print resolution, scale down the document, or print multiple pages per sheet (hereinafter, referred to as a N-up). A plurality of the printing options as described above can be combined. However, the conventional approach does not suggest a solution to positively change the printing options in a case of the deficiency of the residual developer.

SUMMARY OF THE INVENTION

The present general inventive concept provides a printing system and a printing method to efficiently save a developer by providing a user with a menu to change the printing options when a developer is deficient, to set new printing options by the user, and to perform a printing task according to the newly set printing options.

Additional aspects and advantages of the present general inventive concept will be set forth in part in the description which follows and, in part, will be obvious from the description, or may be learned by practice of the general inventive concept.

To achieve the above and/or other features of the present general inventive concept, a printing method includes determining whether a developer is deficient by checking a status of the developer when a print command is input; setting new printing options upon determining the deficiency of the developer; and generating and printing an image according to the newly set printing options.

The setting of new printing options may include displaying a message inquiring about whether to set new printing options upon determining the deficiency of the developer, and the setting of new printing options may be performed by displaying a menu to change the printing options and selecting to set new the printing options in response to the displayed message.

The menu to change the printing options may include at least one of a resolution change, a print percentage change, and a N-up to save the developer.

The foregoing and/or other aspects of the present general inventive concept may also be achieved by providing a printing method of operating a host device connected to an image forming apparatus, the printing method including inquiring to the image forming apparatus about whether the developer is deficient and receiving a response from the image forming apparatus; displaying a message inquiring about whether to change the printing options when the developer is deficient; displaying a menu to change the printing options and receiving newly set printing options when a user selects to change the printing options in response to the displayed message; and transferring print data including the printing options to the image forming apparatus. The printing method may further specify that if the user does not answer the message and does not set new printing options in a predetermined time interval, the preset printing options be communicated to the image forming apparatus.

The menu to change the printing options may include at least one of a resolution change, a print percentage change, and a N-up, to save the developer.

The foregoing and other aspects of the present general inventive concept may also be achieved by providing a printing system including a host device and an image forming apparatus that generates an image from print data transferred from the host device and prints the image, including a status detector to inquire to the image forming apparatus about whether a developer is deficient, and to display a message inquiring about whether to set new printing options when the developer is deficient; and a printer driver to display a menu to change the printing options, to receive the newly set printing options, and to transfer the newly set printing options to the image forming apparatus when a user chooses to set new printing options in response to the message.

The image forming apparatus may generate and print an image according to the newly set printing options.

The image forming apparatus may include a residual developer detector to detect a residual developer and an image forming apparatus controller to determine whether the developer is deficient through the residual developer detector and to respond to the status detector.

The menu to change the printing options may include at least one of a resolution change, a print percentage change, and a N-up, to save the developer.

The status detector may inquire to the image forming apparatus about whether the developer is deficient upon receiving a print start message from the printer driver.

The printer driver may transmit the print start message to the status detector when a print command is input. The print start message may be transferred to the status detector after the printer driver drives and the printing options may be received when the print command is input.

The foregoing and other aspects of the present general inventive concept may also be achieved by providing an image forming apparatus including a print data input section to receive print data; a residual developer detector to detect a residual developer; an image forming apparatus controller to determine whether the developer is deficient through the residual developer detector when a print command is input, to display a menu to change printing options when it is determined that the developer is deficient, and to receive reset printing options; and a print section to print an image according to the reset printing options.

The print data input section may be at least one of a digital camera, a mobile phone, a personal digital assistant (PDA), and a digital camcorder that are connected to at least one of a memory card slot, a universal serial bus (USB) memory port, and a USB port.

The print data may be at least one of non-image data, image data, and video data.

The image forming apparatus may further include a display section to display the menu to change the printing options and an image of the received print data.

The image forming apparatus may further include a print command input section to receive the print command.

The foregoing and other aspects of the present general inventive concept may also be achieved by providing a printing method that includes receiving print data from at least one portable device including a digital camera, a mobile phone, a personal digital assistant (PDA), and a digital camcorder; determining whether a developer is deficient when a data print command is input; displaying a menu to change printing options and receiving newly set printing options when it is determined that the developer is deficient; and printing an image according to the newly set printing options.

The menu to change the printing options may include at least one of a resolution change, a print percentage change, and a N-up, to save the developer.

The foregoing and other aspects of the present general inventive concept may also be achieved by providing a printing system providing a menu to change the printing options when a developer is deficient, the printing system including: a user interface to display the menu to change the printing options, to allow a user to set new printing options based on the displayed menu to change printing options to newly set printing options, and to input the data to be printed; a developer level detector to monitor the developer level and to send a warning message to the user interface when the developer level becomes low; and an image forming module to receiver and print the data from the user interface according to the newly set printing options.

The foregoing and other aspects of the present general inventive concept may also be achieved by providing a method of a printing system that controls a print section, a developer detector and a user interface, the method including inquiring to the developer detector about the developer level, controlling the user interface to display a menu to change printing options if the developer is low, receiving the printing options chosen by the user from the user interface, and controlling the printing section to print the data according to the printing options.

BRIEF DESCRIPTION OF THE DRAWINGS

These and/or other aspects and advantages of the present general inventive concept will become apparent and more readily appreciated from the following description of exemplary embodiments, taken in conjunction with the accompanying drawing figures of which.

DETAILED DESCRIPTION OF THE PREFERRED EMBODIMENTS

Figure 1:
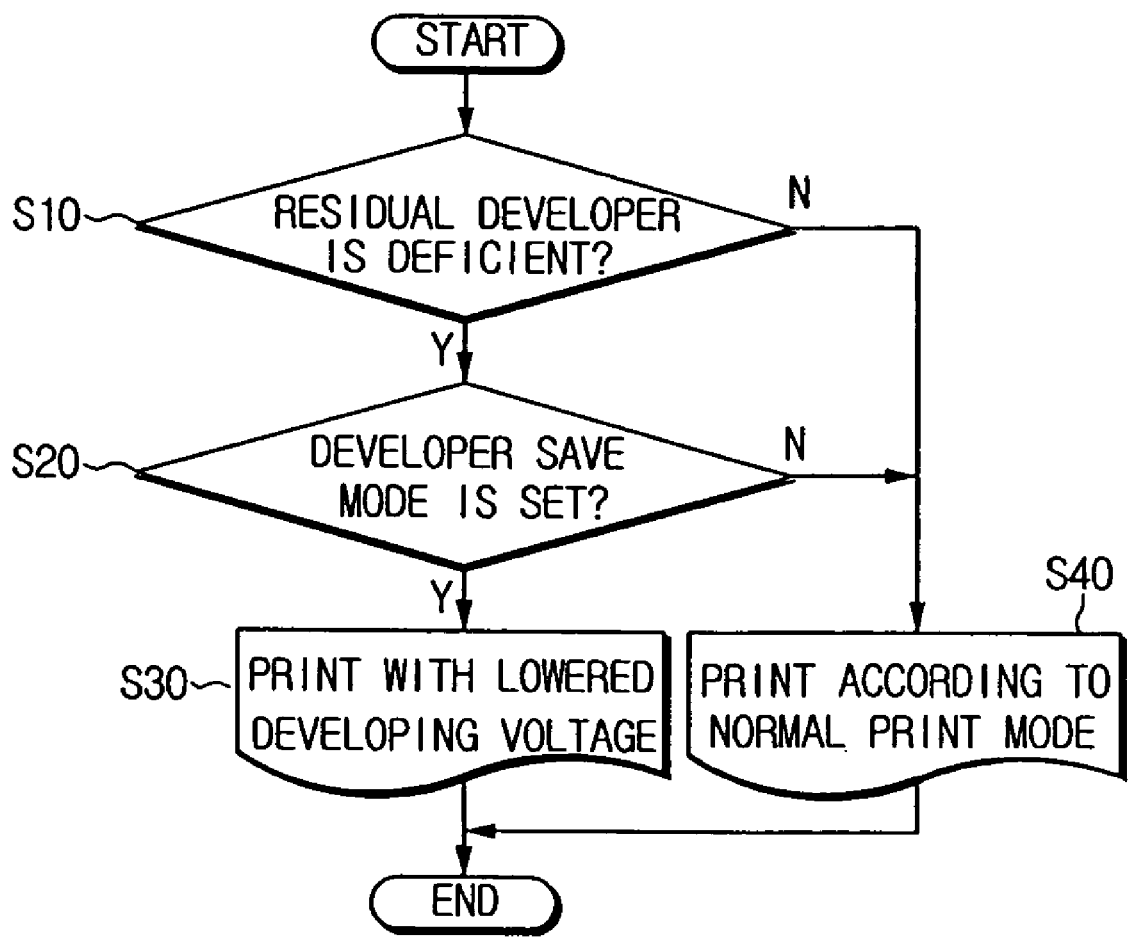
FIG. 1 is flowchart illustrating how a document is printed according to a conventional developer save function.

Reference will now be made in detail to the embodiment of the present general inventive concept, examples of which are illustrated in the accompanying drawings, wherein like reference numerals refer to the like elements throughout. The embodiments are described below in order to explain the present general inventive concept while referring to the drawings.

Figure 2:
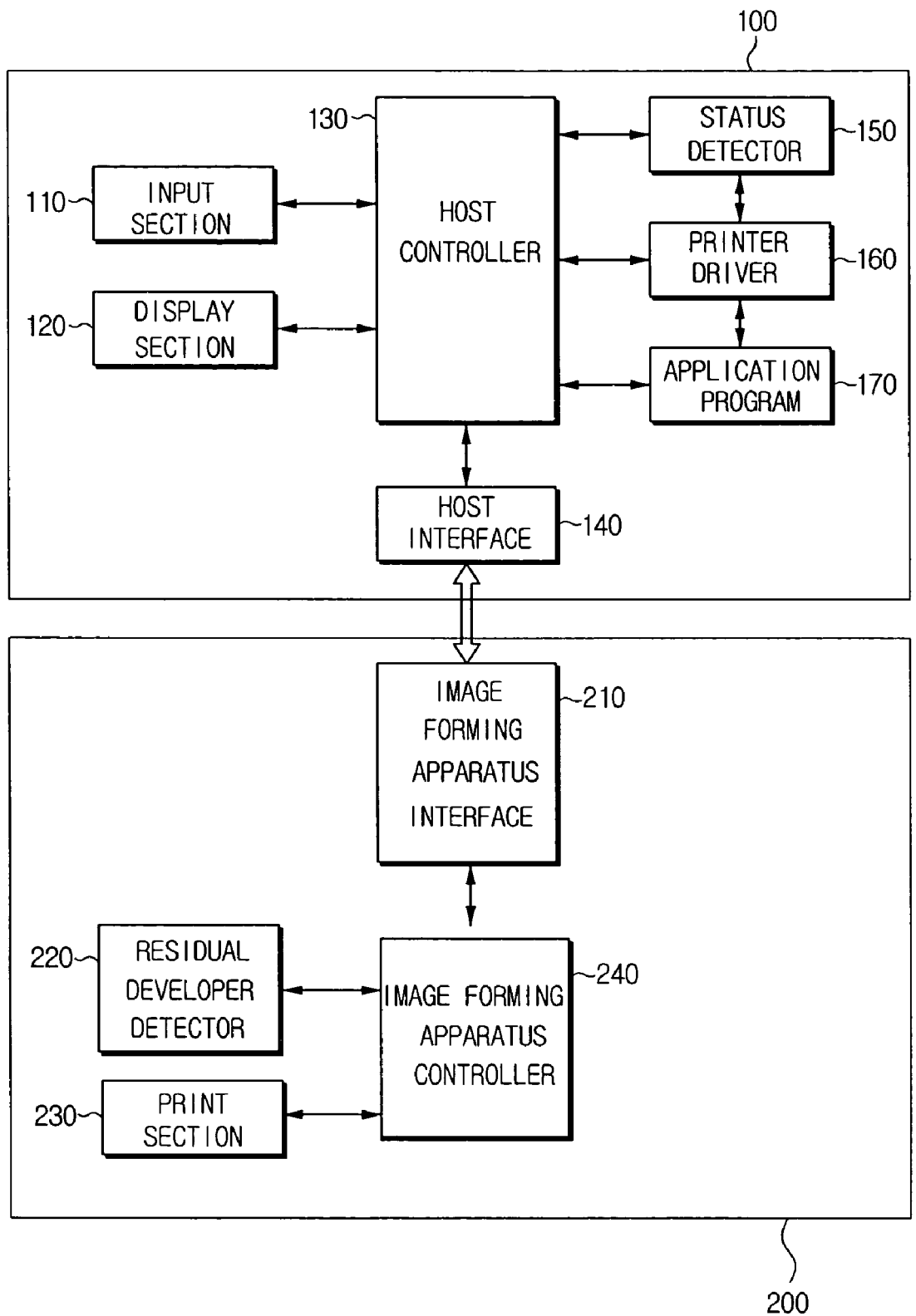
FIG. 2 is a block diagram of a printing system according to an embodiment of the present general inventive concept.

FIG. 2 is a block diagram of a printing system according to an embodiment of the present general inventive concept.

Referring to FIG. 2, the printing system includes a host device 100 and an image forming apparatus 200. The host device 100 includes an input section 110, a display section 120, a host controller 130, a host interface 140, a status detector 150, a printer driver 160, and an application program 170. The image forming apparatus 200 includes an image forming apparatus interface 210, a residual developer detector 220, a print section 230, and an image forming apparatus controller 240.

The input section 110 receives a user command instructing to set or select functions supported by the host device 100. The input section 110 can be a keyboard or a mouse. When a command is input to the input section 110, the host controller 130 controls the components of the host device 100 based on the input command.

The display section 120 functions as a user interface of an application program 170, a user interface of the printer driver 160, and an interface of a status detector 150, under the control of the host controller 130. In an embodiment of the present general inventive concept, the display section 120 may display a menu to change the printing options, a message indicating the deficiency of the developer, a message asking whether to change the printing options, and the like. A user can input a printing option change command and set new printing options based on the displayed menus and/or messages, to execute a developer save function. The display section 120 may be a monitor.

The host interface 130 communicatively connects the host device 100 to an external device. The host interface 130 may be a parallel port, a universal serial bus (USB) port, a radio module, and the like. The host interface 130 can be connected to the image forming apparatus interface 210 to exchange data information relating to the printing task between the host device 100 and the image forming apparatus 200. Thus, the printing-related information is exchanged. The new printing options are provided to the image forming apparatus 200 through the host interface 130.

The printer driver 160 converts a document to be printed, which may be created by the application program 170, into data interpretable by the image forming apparatus 200. In addition, the printer driver 160 enables setting of the printing options such as a resolution, an N-up, a scaled-down print, a print range, and a media type, to be applied to the printed document. When the residual developer is deficient, the printer driver 160 displays the menu to change the printing options on the display section 120 so that the user can set new printing options. The printer driver 160 transfers print data including the newly set printing options to the image forming apparatus 200.

The status detector 150 can be a utility program such as a status monitor. The status detector 150 examines a printer status including turn-on or turn-off, a paper jam, the lack of the developer, and so forth with respect to the printer, when the printing task is started. When receiving a print start message from the printer driver 160, the status detector 150 may inquire to the image forming apparatus controller 240 about whether the developer is deficient. If the developer is deficient, the status detector 150 displays a message indicating the lack of the developer and a message inquiring about whether to change the printing options, these messages being displayed on the display section 120.

The image forming apparatus interface 210 communicatively connects the image forming apparatus 200 to an external device. The image forming apparatus interface 210 may be a parallel port, a USB port, a radio module, and the like. In an embodiment of the present general inventive concept, the image forming apparatus interface 210 is used to exchange print-related data between the host device 100 and the image forming apparatus 200.

The print section 230 conducts the printing task based on the print data including the printing options provided from the printer driver 160, under the control of the image forming apparatus controller 240.

The residual developer detector 220 provides information relating to the residual developer, under the control of the image forming apparatus controller 240.

Figure 3:
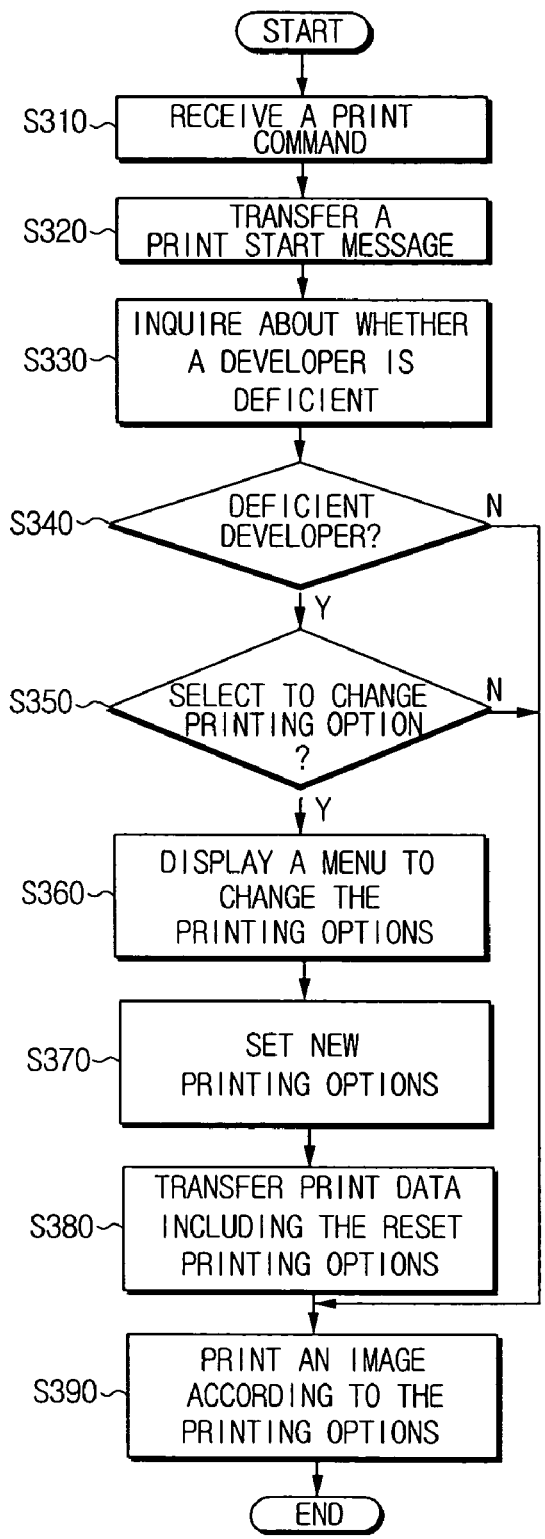
FIG. 3 is a flowchart of a printing method according to an embodiment of the present general inventive concept.

FIG. 3 is a flowchart illustrating a printing method according to an embodiment of the present general inventive concept.

Referring to FIGS. 2 and 3, upon receiving the print command through the input section 110 (operation S310), during a document processing in the application program 170 such as Word Processor the application program 170 displays a print setup window at the display 120. When a Properties button is selected in the print setup window, the printer driver 160 displays a printing option setup window at the display section 120 and receives the printing options set by the user. The user may select the simple printing options including the number of copies, the print range, and the like, and then input the print command in the print setup window. Alternatively, the user may select the Properties button, specify the printing options in further detail, such as the resolution and the scaled-down print, and then input the print command in the printing option setup window provided by the printer driver 160.

After setting the printing options, the printer driver 160, under the control of the host controller 130, converts the printing options and the document to be printed into print data recognizable by the image forming apparatus 200. The printer driver 160 provides the converted print data to the image forming apparatus controller 240 and transfers a print start message indicating the start of the printing task to the status detector 150 (operation S320).

Alternatively, upon receiving the print command in the application program 170, the printer driver 160 may transfer the print start message to the status detector 150 without applying the set printing options.

Upon the receipt of the print start command, the status detector 150 inquires to the image forming apparatus controller 240 about whether the residual developer is deficient (operation S330). Next, the image forming apparatus controller 240 determines whether the residual developer is deficient using the residual developer detector 220 (operation S340). If the residual developer is insufficient, a response message indicating the deficiency of the residual developer is transferred from the image forming apparatus controller 240 to the status detector 150 and it is deferred to print the print data received from the printer driver 160.

Upon receiving the response message indicating the deficient developer from the image forming apparatus controller 240, the status detector 150 displays a message informing of the deficiency of the residual developer, and also displays a message inquiring about whether to change the printing options, at the display section 120. The user can then select whether to change the printing options (operation S350).

When the user selects to change the printing options, the printer driver 160 displays a menu to enable the user to change the printing options, at the display section 120 (operation S360). The menu to change the printing options includes items that can be adjusted to save the developer, such as the resolution, the scaled-down print, the N-up, and the like. The user can change a preset resolution to a lower resolution using the resolution item. For example, the resolution at 1200 dpi can be lowered to 600 dpi or 300 dpi to save the developer.

Alternatively, rather than printing according to the printing options set at operation S310, it is possible to print the document to be printed using less developer by changing a print magnification percentage to reduce the size of the document image printed on a sheet using the scaling item, or changing the number of pages per sheet using the N-up item.

When the printing options are changed using the menu to change the printing options (operation S370), the printer driver 160 transfers the print data including the newly set printing options to the image forming apparatus controller 240 (operation S380).

Upon receiving the newly set printing options, the image forming apparatus controller 240 controls the print section 230 to print an image according to the newly set printing options (operation S390).

If the user selects not to change the printing options at operation S350, the image forming apparatus controller 240 prints the deferred print data according to preset printing options.

Figure 4:
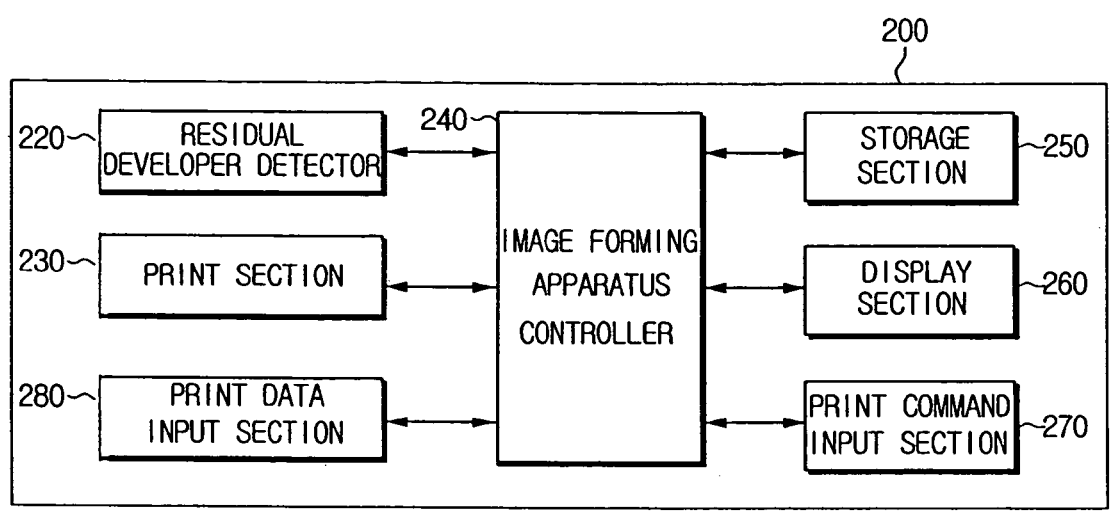
FIG. 4 is a block diagram of a printing system according to another embodiment of the present general inventive concept.

FIG. 4 is a block diagram of a printing system according to another embodiment of the present general inventive concept.

According to the embodiment of FIG. 4, a printing system includes a residual developer detector 220, a print section 230, an image forming apparatus controller 240, a storage section 250, a display section 260, a print command input section 270, and a print data input section 280.

The print section 230 prints, under the control of the image forming apparatus controller 240, based on the print data including the printing options that may have been provided by a printer driver (not shown) or received through the print data input section 280. The residual developer detector 220 provides information relating to the residual developer under the control of the image forming apparatus controller 240.

The storage section 250 stores control programs required to implement the functions of the image forming apparatus 200, data generated during the program execution, and a document to be printed.

The print command input section 270 can receive a user command instructing to set or select the functions supported by the image forming apparatus 200. The print command input section 270 may be provided with a plurality of input buttons.

The display section 260 can be a liquid crystal display (LCD) panel. The display section 260 displays information relating to an operational status, the lack of printing papers, the deficiency of the developer, and the like. In another embodiment of the present general inventive concept, when the developer is deficient, the display section 260 can display a message inquiring about whether to change the printing options and a menu to change the printing options. Furthermore, the display section 260 can display print data such as image data, non-image data, or video data being input through the print data input section 280.

The image forming apparatus controller 240 determines whether the developer is deficient using the residual developer detector 220. If the developer is deficient, the image forming apparatus controller 240 controls to display the menu to change the printing options at the display section 260 to receive the changed printing options from the user. Upon receiving the changed printing options, the image forming apparatus controller 240 controls the print section 230 to print a document according to the changed printing options.

The print data input section 280 includes a portable device such as a digital camera, a mobile phone, a personal digital assistant (PDA), or a digital camcorder. The print data input section 280 further includes an interface to support the connection between the portable device and the image forming apparatus 200. The print data such as image data, non-image data, or video data stored in the portable device of the user, not being a personal computer, can be provided to the image forming apparatus 200 through the print data input section 280. Accordingly, the image forming apparatus 200 can print the image independently from the personal computer being connected.

Figure 5:
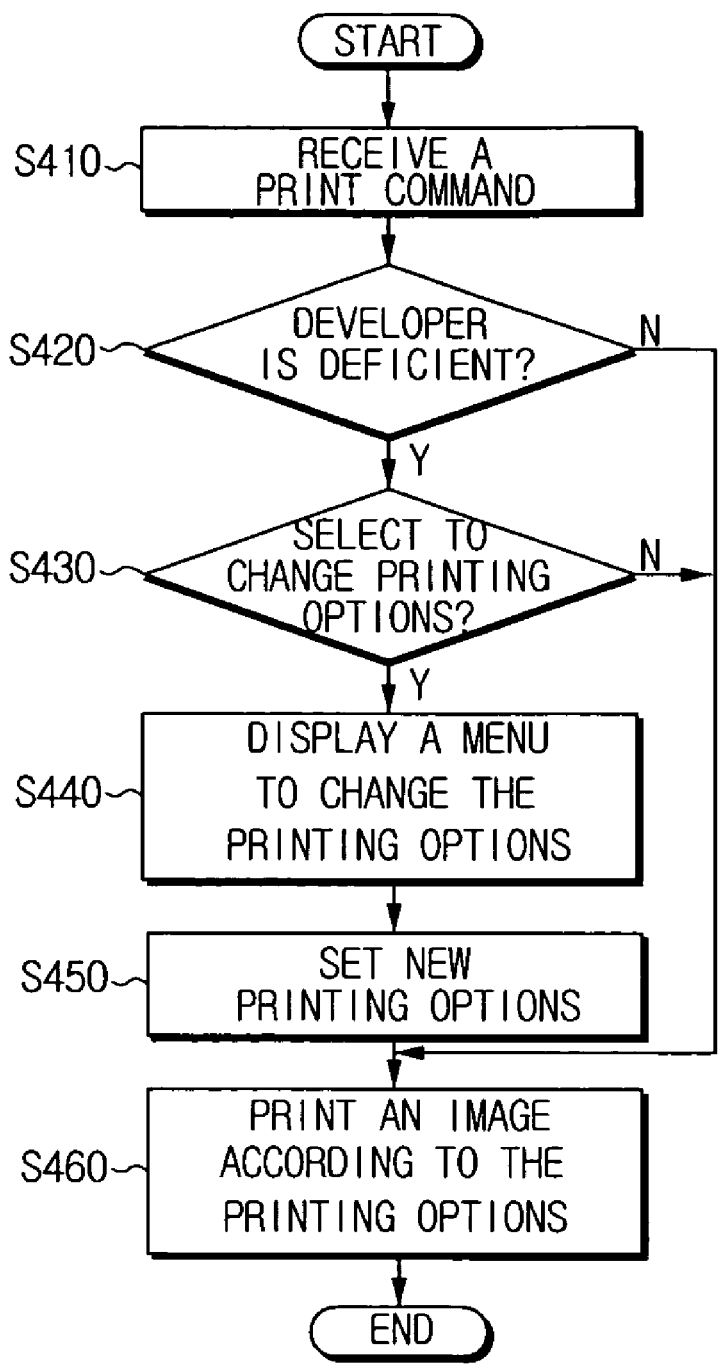
FIG. 5 is a flowchart of a printing method according to another embodiment of the present general inventive concept.

FIG. 5 is a flowchart explaining a printing method according to another embodiment of the present general inventive concept.

Referring to FIG. 4 and FIG. 5, upon receiving through the print command input section 270 the print command for a document that is stored in the storage section 250 or is input through the print data input section 280 (operation S410), the image forming apparatus controller 240 determines whether the residual developer is deficient through the residual developer detector 220 (operation S420). If there is enough developer, the document is printed according to the preset printing options.

When the residual developer is deficient, the image forming apparatus controller 240 controls the display section 260 to display a message indicating the deficient residual developer and a message inquiring about whether to change the printing options so that the user can select whether to change the printing options (operation S430).

If the user selects to change the printing options, the image forming apparatus controller 240 controls the display section 260 to display a menu to change the printing options (operation S440). The menu to change the printing options includes items that can be adjusted to save the developer, such as the resolution, the print percentage, the N-up, and the like.

When the user sets new the printing options using the menu to change the printing options (operation S450), the image forming apparatus controller 240 controls the print section 230 to print the document stored in the storage section 250 as the image according to the newly set printing options, thus completing the printing task (operation S460).

Otherwise, if the user does not select to change the printing options at operation S430, the document is printed according to preset printing options.

As explained above, even when the user inputs the print command while the developer save mode is not set in advance, the printing system according to the present general inventive concept inquires to the user about whether to change the printing options if the residual developer is deficient, and conducts the printing task according to newly set printing options is selected. Therefore, more pages can be printed using the same amount of the developer.

Furthermore, if the residual developer is deficient, not only the printing density is lowered, but the menu to change the printing options allows the user to adjust the resolution, the print scale, and the N-up. Thus, it is possible to save the developer more efficient.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing method of a printing system including a host device and an image forming apparatus that generates an image from print data transferred from the host device and prints the image, the printing method comprising:
    determining, at the image forming apparatus, whether a developer is deficient by checking a status of the developer when a print command is input;
    setting, at the host device, new printing options upon determining the deficiency of the developer before transferring print data to the image forming apparatus; and
    generating and printing, at the image forming apparatus, an image according to the newly set printing options.

2. The printing method according to claim 1, wherein setting new printing options comprises:
    displaying a message inquiring about whether to set new the printing options upon determining the deficiency of the developer; and
    setting the new printing options using a displayed menu to change the printing options upon selecting to set new printing options in response to the message.

3. The printing method according to claim 2, wherein the menu to change the printing options includes at least one of a resolution change, a print percentage change, and a N-up to save the developer.

4. A printing method of a printing system including a host device and an image forming apparatus that generates an image from print data transferred from the host device and prints the image, the printing method comprising:
    inquiring, at the host device, to the image forming apparatus about whether a developer is deficient and receiving a response from the image forming apparatus;
    displaying, at the host device, a message inquiring about whether to change printing options when the developer is deficient;
    displaying, at the host device, a menu to change the printing options and receiving newly set printing options when a user selects to change the printing options in response to the displayed message; and transferring, at the host device, print data including the newly set printing options to the image forming apparatus.

5. The printing method according to claim 4, further comprising:

wherein if the user does not answer the message and does not set new printing options in a predetermined time interval, preset printing options together with print data are transferred to the image forming apparatus.

6. The printing method according to claim 4, wherein the menu to change the printing options includes at least one of a resolution change, a print percentage change, and a N-up, to save the developer.

7. A printing system including a host device and an image forming apparatus that generates an image from print data transferred from the host device and prints the image, the host device comprising:

a status detector to inquire to the image forming apparatus about whether a developer is deficient, and to display a message inquiring about whether to set new printing options when the developer is deficient; and a printer driver to display a menu to change the printing options, to receive the newly set printing options, and to transfer the newly set printing options to the image forming apparatus if a user sets the new printing options in response to the message before transferring print data to the image forming apparatus.

8. The printing system according to claim 7, wherein the image forming apparatus generates and prints an image according to the newly set printing options.

9. The printing system according to claim 7, wherein the image forming apparatus comprises:

a residual developer detector to detect a residual developer; and an image forming apparatus controller to determine whether the developer is deficient through the residual developer detector and to respond to the status detector.

10. The printing system according to claim 7, wherein the menu to change the printing options includes at least one of a resolution change, a print percentage change, and a N-up, to save the developer.

11. The printing system according to claim 7, wherein the status detector inquires the image forming apparatus about whether the developer is deficient, upon receiving a print start message from the printer driver.

12. The printing system according to claim 11, wherein the printer driver transmits the print start message to the status detector when a print command is input.

13. The printing system according to claim 11, wherein the printer driver transfers the print start message to the status detector after the printing options are received when a print command is input.

14. An image forming apparatus comprising:

a print data input section to receive print data;

a residual developer detector to detect a residual developer;

an image forming apparatus controller to determine whether the developer is deficient through the residual developer detector when a print command is input, to display a menu to change printing options to newly set printing options when it is determined that the developer is deficient, and to receive the newly set printing options; and a print section to print an image of the print data according to the newly set printing options.

15. The image forming apparatus according to claim 14, wherein the menu to change the printing options includes at least one of a resolution change, a print percentage change, and a N-up, to save the developer.

16. The image forming apparatus according to claim 14, wherein the print data input section is at least one of a digital camera, a mobile phone, a personal digital assistant (PDA), and a digital camcorder that are connected to at least one of a memory card slot, a universal serial bus (USB) memory port, and a USB port.

17. The image forming apparatus according to claim 14, wherein the print data is at least one of non-image data, image data, and video data.

18. The image forming apparatus according to claim 14, further comprising:

a display section to display the menu to change printing options and an image of the received print data.

19. The image forming apparatus according to claim 14, further comprising:

a print command input section to receive the print command.

20. A printing method of an image forming apparatus comprising:

receiving print data from at least one portable device including a digital camera, a mobile phone, a personal digital assistant (PDA), and a digital camcorder;

determining whether a developer is deficient when a data print command is input;

displaying a menu to change printing options to newly set printing options and receiving the newly set printing options when it is determined that the developer is deficient; and printing an image according to the newly set printing options.

21. The printing method according to claim 20, wherein the menu to change the printing options includes at least one of a resolution change, a print percentage change, and a N-up, to save the developer.

22. A printing system providing a menu to change printing options when a developer is deficient, comprising:

a user interface to display the menu to change the printing options, to allow a user to set new printing options based on the displayed menu to change printing options to newly set printing options, and to input data to be printed;

a developer level detector to monitor a developer level and to send a warning message to the user interface to be displayed when the developer level becomes low; and an image forming module to receive and print the data received from the user interface according to the newly set printing options.

23. The printing system according to claim 22 wherein the user interface comprises:

an input section to receive image data from an external device;

a display; and a user input section to allow a user to choose new printing options based on the menu to change printing options.

24. The printing system according to claim 23 wherein the user interface further comprises an application program module to run graphic software to create and to display images.

25. The printing system according to claim 22 wherein the developer level detector sends different warning messages depending on how low is the developer level.

26. A method of operating a printing system that controls a print section, a developer detector and a user interface, the method comprising:

inquiring to the developer detector about a developer level;

controlling the user interface to display a menu to change printing options if the developer level is low;

receiving the printing options chosen by a user from the user interface; and controlling the print section to print data according to the printing options.

27. The method according to claim 26 further comprising receiving data to be printed from at least one external portable device including a digital camera, a mobile phone, a personal digital assistant (PDA), and a digital camcorder.

28. The method according to claim 26, wherein if printing options are not received from the user interface in a predetermined time interval, then the print section is controlled to print the data according to preset printing options.

29. The method according to claim 26, further comprising:

lowering a printing resolution by a predetermined amount if a controller does not receive new printing options from the user interface in a predetermined time interval.

\* \* \* \* \*